United States Patent [19]

Beck et al.

[11] Patent Number: 4,964,910

[45] Date of Patent: Oct. 23, 1990

[54] TRANSFER FLUID FOR SPIRIT DUPLICATING SYSTEMS

[75] Inventors: Donald R. Beck, Pompton Plains; Loren Shelffo, South Orange; Susan P. Ontawar, North Haledon, all of N.J.

[73] Assignee: Repeat-O-Type Manufacturing Corporation, Wayne, N.J.

[21] Appl. No.: 358,834

[22] Filed: May 30, 1989

[51] Int. Cl.$^5$ .............................................. C09D 11/00

[52] U.S. Cl. ........................................ 106/21; 106/19; 106/311; 106/14.5; 252/73

[58] Field of Search .................. 106/19, 21, 311, 14.5; 252/73

[56] References Cited

U.S. PATENT DOCUMENTS

| | | | |
|---|---|---|---|
| 1,780,927 | 11/1930 | Jordan | 252/73 |
| 1,900,014 | 5/1933 | Graves | 252/73 |
| 2,144,104 | 6/1939 | Cochran | 106/14.5 |
| 2,294,711 | 9/1942 | Bjorksten | 106/14.5 |
| 2,369,435 | 2/1945 | Coghill et al. | 252/73 |
| 2,634,677 | 4/1953 | Klimkowski et al. | 106/14.5 |
| 2,748,024 | 5/1956 | Klimkowski et al. | 106/21 |
| 2,795,504 | 6/1957 | Klimkowski et al. | 106/21 |
| 2,873,671 | 2/1959 | Florence | 106/14.5 |
| 2,902,452 | 9/1959 | Holzinger | 252/73 |
| 3,086,872 | 4/1963 | Locke | 106/14.5 |
| 3,479,192 | 11/1969 | Clarke et al. | 106/14.5 |
| 3,607,756 | 9/1971 | Phillips | 252/73 |
| 3,809,152 | 5/1974 | Boehmer | 252/73 |
| 3,979,550 | 9/1976 | Panken | 106/21 |
| 4,233,876 | 11/1980 | Leahy et al. | 252/73 |

*Primary Examiner*—William R. Dixon, Jr.
*Assistant Examiner*—Helene Klemanski
*Attorney, Agent, or Firm*—W. Patrick Quast

[57] ABSTRACT

A transfer fluid for spirit fluid type duplicating systems is disclosed which comprises, generally a polyhydric alcohol, 20 to 90% by weight; and water, 10 to 80% by weight. For certain machines, a wetting agent 0 to 2% by weight, can be used with an adjustment accordingly in the amounts of the other materials.

7 Claims, No Drawings

TRANSFER FLUID FOR SPIRIT DUPLICATING SYSTEMS

FIELD OF THE INVENTION

This disclosure relates generally to transfer fluids for spirit duplicating systems and more particularly to an improved transfer fluid employing a relative high percentage of water.

BACKGROUND OF THE INVENTION

Spirit duplicating systems are still largely used in this country and abroad by many institutions, particularly schools. The use of toxic, volatile, and flammable liquids for transfer fluids in these systems have been a limitation since their inception. The transfer fluid is a solvent which dampens the copy sheet enabling the extraction of some of the dye from the master to make an image on the copy. Transfer fluids typically are either comprised of 90% ethanol, or methanol, with the remainder a composite of water and/or cellosolve, a material which improves the solubility of the dye material on the master so as to produce a result of better transferred images on the copies made.

As noted, a small percentage of water has been used in order to reduce the cost of current transfer fluids. However, the percentage of water is limited to under 10%, to avoid resultant paper curl.

As identified, the methanol, or ethanol systems are extremely flammable and toxic. This results, in significant storage and disposal problems.

Further, people who have to work routinely with these types of systems, and especially those employing a methanol transfer fluid, expose themselves to the potential for serious eye damage. People working with the ethanol base systems on a regular basis can be adversely affected as well.

Recently, it has been identified that certain of the cellosolve additive materials have carcinogenic side effects which have discouraged their continuing use. Alternative materials to the cellosolve have been found. However, these have resulted in an unpleasant odor, as well as headache and nausea.

The use of water heretofore has been avoided because of the significant paper curl which results when the paper is submitted to the wetting of the transfer fluid. With percentages in excess of the amounts used in the methanol or ethanol systems, the paper curl became so bad and occurred so quickly, that routine paper jams occurred in the duplicating machines, after a copy or two. This has been attributed to the relatively quick expansion of the copy paper side receiving the transfer fluid containing the water, in comparison to the opposite side.

Further, in order for the water base systems to be pursued, a system would have to be devised which would avoid corrosive effects on the machine parts. Also, due to the nature of the transfer system in some of these machines, i.e., a form of wicking system, any attempts to use water in the past would have required a highly pure form of water, with little or no dissolved minerals which could crystallize and cake-up the wicking system.

It is therefore a primary object of this invention to provide transfer fluid which does not result in curling of the copy paper.

It is another object of this invention to provide a water based, transfer fluid which does not result in a curling of the copy paper.

It is another object of this invention to provide a transfer fluid which is not toxic.

It is still another object of this invention to provide a transfer fluid which is odorless.

It is yet another object of this invention to provide a transfer fluid which is anticorrosive.

SUMMARY OF THE INVENTION

Towards the accomplishment of these objectives, and others, as well as for various advantages which will be more apparent from our reading of the description which follows, there is disclosed a transfer fluid for spirit duplicating systems, comprising generally, a polyhydric alcohol, 20 to 90% by weight and water, 10 to 80% by weight. For certain machines, a wetting agent can be added in the proportion 0 to 2% by weight, with an adjustment, accordingly, in the amounts of the other materials.

DESCRIPTION OF THE PREFERRED EMBODIMENT

In experimenting with the various solutions to be used as a transfer fluid, a standard has to be established with respect to acceptable paper "curl". The standard has been set that the transfer fluid employed will be acceptable if a stack of 25 copies made in the machine containing the fluid will remain flat as viewed by the observer, after three hours, i.e., no perceptible curl.

Against this standard, experimentation with the various percentages of ingredients has been tried.

Generally, the transfer fluid which has been found acceptable, comprises a liquid polyhydric alcohol having a molecular weight up to approximately 5,000 (as used by Union Carbide of Danbury, Conn., for their polyethylene glycols) and water. Experimentation indicates that the use of 100% polyhydric alcohol will work fine in many spirit duplicating machines. However, the relatively high viscosity of some of these, for example, glycerine, may present a particular machine with a problem because of its fluid distribution system. Again, the transfer fluid will generally comprise a polyhydric alcohol and water, mixed together in a broad range of percentages as set forth hereinafter.

Ideally, from a cost to produce point of view, the higher percentage of water, of course, the more cost effective the product. Generally, it was found that the upper limit of the percentage of water by weight is 75%; with the polyhydric alcohol at 25% by weight. This upper limit of water content can be extended somewhat for particular machines and duplicating paper. So, for example, with the Conqueror model of spirit duplicator, manufactured by the Heyer Company of Chicago, Ill., when utilizing 20 lb. duplicator bond paper produced by the James River Paper Company of Richmond, Va., it has been determined that a transfer fluid comprising 80% by weight of water and 20% by weight of glycerine was suitable.

When considering variations in machines and their particular means for transfer fluid distribution, as well as the variations in duplicating paper, from the perspective of marketing a product which will have relatively universal application, it is found beneficial to include a wetting agent, typically up to 2% by weight. Use of nonionic, anionic, and cationic types as for example, Triton X45, Triton X200, and Triton RW100, marketed by the Rohm and Haas Company, of Philadelphia, Pa., U.S.A., have been found acceptable. Higher percentages of the wetting agent can be used (5% was employed in one experiment with no adverse effect) where the machine and/or the type of paper dictates the higher percentage to achieve good copies.

Keeping in mind recent federal legislation, as for example, the "Right-to-Know" Law, it becomes important to provide materials which do not create additional hazards to the environment or the user. In this respect, any liquid polyhydric alcohol, including glycerine, ethylene glycol, propylene glycol, diethylene glycol, triethylene glycol, dipropylene glycol, and polyethylene glycols generally would be acceptable. However, due to the fact that propylene glycol is not toxic, as are certain others of the polyhydric alcohols, it is, arguably, preferred. Also, since certain wetting agents may have carcinogenic effects, it is appropriate to select those types which do not create a concern in the mind of the users.

As noted above, any of the polyhydric alcohols indicated will work within the percentages which have been found acceptable. Thus, an acceptable fluid will include: any liquid polyhydric alcohol in the range of 20 to 90% by weight; water in the range of 10 to 80% by weight; and, if necessary, a wetting agent, or surfactant in the range 0 to 2% by weight, with an adjustment in the amounts of the other materials.

The following fluids were tested in the standard Astro II machine (Standard Duplicating Machine Corp., Everett, Mass.), and were found to produce satisfactory copy with no paper curl:

| | | |
|---|---|---|
| Example I | Ethylene Glycol | 35% by weight |
| | Water | 65% by weight |
| Example II | Propylene Glycol | 20% by weight |
| | Water | 80% by weight |
| Example III | Propylene Glycol | 90% by weight |
| | Water | 9% by weight |
| | Triton X45 | 1% by weight |
| Example IV | Glycerine | 50% by weight |
| | Water | 49% by weight |
| | Triton X200 | 1% by weight |

Mixtures of the following polyhydric alcohols containing 35% of the alcohol, 64% water and 1% Triton RW100, were found to produce satisfactory copy with no paper curl when used in the Even though not actually tested, a study of the chemical characteristics of dipropylene glycol indicates that it too will function satisfactorily as the polyhydric alcohol component in the transfer fluid described.

A preferred embodiment of the transfer fluid which appears to have the greatest universality in terms of the number of duplicating machines with which it works, and which is most desirable from a safe environment perspective, comprises propylene glycol, about 50% by weight; water, about 49% by weight; and a wetting agent, e.g., Triton X45, about 1% by weight.

As noted above in the Background of the Invention section certain fluid distribution systems are sensitive to the mineral content of the water that is used in the ethanol or methanol type systems. It has been the experience in the development of the transfer fluid described herein, that ordinary tap water functions just as adequately as chemically pure water, thus accomplishing the benefits of the invention at a further reduced cost.

Also, the polyhydric alcohols being relatively non-evaporative, significantly diminish the degree of corrosive residues. So, for example, operating the Roneo L440 machine,(manufactured by Duplo Manufacturing, 7-6 Izum, Honcho, 1 Chome, Komaeshi, Tokyo, Japan; imported and distributed in the United States by Standard Duplicating Machines Corp. of 10 Connector Road, Andover, Mass.) for a period of five (5) months, using a transfer fluid comprising polyhydric alcohol by weight 60%, and water 40% by weight, has not resulted in any perceptible corrosive effects on the metallic parts of the machine.

The foregoing description of the invention is illustrative and not restrictive, it being intended to limit the invention only by the scope of the appended claims.

What is claimed is:

1. In a method of transferring an image from a master copy sheet to a duplicate copy sheet in a spirit type duplicating system wherein the copy sheet used to contact the master sheet is dampened with a transfer fluid which is capable of extracting from said master sheet onto said copy sheet an image forming dye that is contained on said master sheet and to thereby impart a duplicate image on the copy sheet, the improvement of inhibiting curling of the copy sheet comprising employing a transfer fluid that inhibits paper curling, is

2. The method of claim 1 wherein the transfer fluid comprises polyhydric alcohol, 20–90% by weight; water, 9–80% by weight; and, a wetting agent 0–2% by weight.

3. The method of claim 1 wherein the transfer fluid for spirit fluid type duplicating systems, consists of a liquid polyhydric alcohol, 25 to 90% by weight; and water, 10 to 75% by weight.

4. The method claim 1 wherein the transfer fluid for spirit fluid type duplicating systems consists of a liquid polyhydric alcohol, 25 to 90% by weight; water, 9 to 75% by weight; and a wetting agent, 0 to 2% by weight.

5. The method of claim 1 wherein the liquid polyhydric alcohol is selected from the group consisting of glycerol, ethylene glycol, propylene glycol, diethylene glycol, triethylene glycol, and dipropylene glycol.

6. The method of claim 1 wherein the liquid polyhydric alcohol is a polyethylene glycol having a molecular weight from approximately 100 to 5,000.

7. The method of claim 1 wherein the transfer fluid comprises propylene glycol, about 50% by weight; water, about 49% by weight; and a wetting agent, about 1% by weight.

* * * * *